Feb. 3, 1925.

A. H. FORSYTHE 1,524,923

GEAR SHIFT MECHANISM

Filed July 25, 1922     3 Sheets-Sheet 1

Inventor
Albert H Forsythe
By Henry Orth Jr.
Attorney

Patented Feb. 3, 1925.

1,524,923

UNITED STATES PATENT OFFICE.

ALBERT H. FORSYTHE, OF JOPLIN, MISSOURI.

GEAR-SHIFT MECHANISM.

Application filed July 25, 1922. Serial No. 577,384.

*To all whom it may concern:*

Be it known that I, ALBERT H. FORSYTHE, a citizen of the United States of America, of Joplin, county of Jasper, State of Missouri, United States of America, have invented certain new and useful Improvements in Gear-Shift Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to mechanism for shifting the gears of change speed gears, and more particularly to the shifting of such gears in motor vehicles, and also to the operation of the clutch of such a vehicle.

This I do by a fluid, such as oil, but preferably, and not necessarily, by pressure air.

It is necessary in all gear shifts, manual or otherwise, to first release the clutch, and then shift the gears, but in pneumatic mechanisms as heretofore constructed it has been necessary to have a separate valve, button or the like for the clutch and another one for the particular gear shifting device.

The problem has been to eliminate one of these and cause the actuating air to operate the clutch and the shift always in proper sequence without any reliance whatever upon the operator for the sequence of these operations. This problem I have solved by supplying air to first actuate the clutch and then cause the same air to actuate the shifting device, i. e. I supply air to and through the clutch operating mechanism to the shifting mechanism. By this method I get the proper sequence of operation of the two devices with absolutely no danger of initiating the operation of the one before the other. The method of operation also consists in exhausting or passing the clutch actuating air through any one of plurality of shifting cylinders, and controll.ng or adjusting the exhaust of such air differently for different shifting pistons or pairs of pistons and my invention includes thereafter again using the air for resetting or returning to normal position valve mechanism ut'lized in controlling the air admission from a suitable source of supply, and finally my invention consists of mechanism for carrying out this method as hereinafter will be fully described and claimed.

Referring to the drawings in which like parts are similarly designated,

Figure 1:
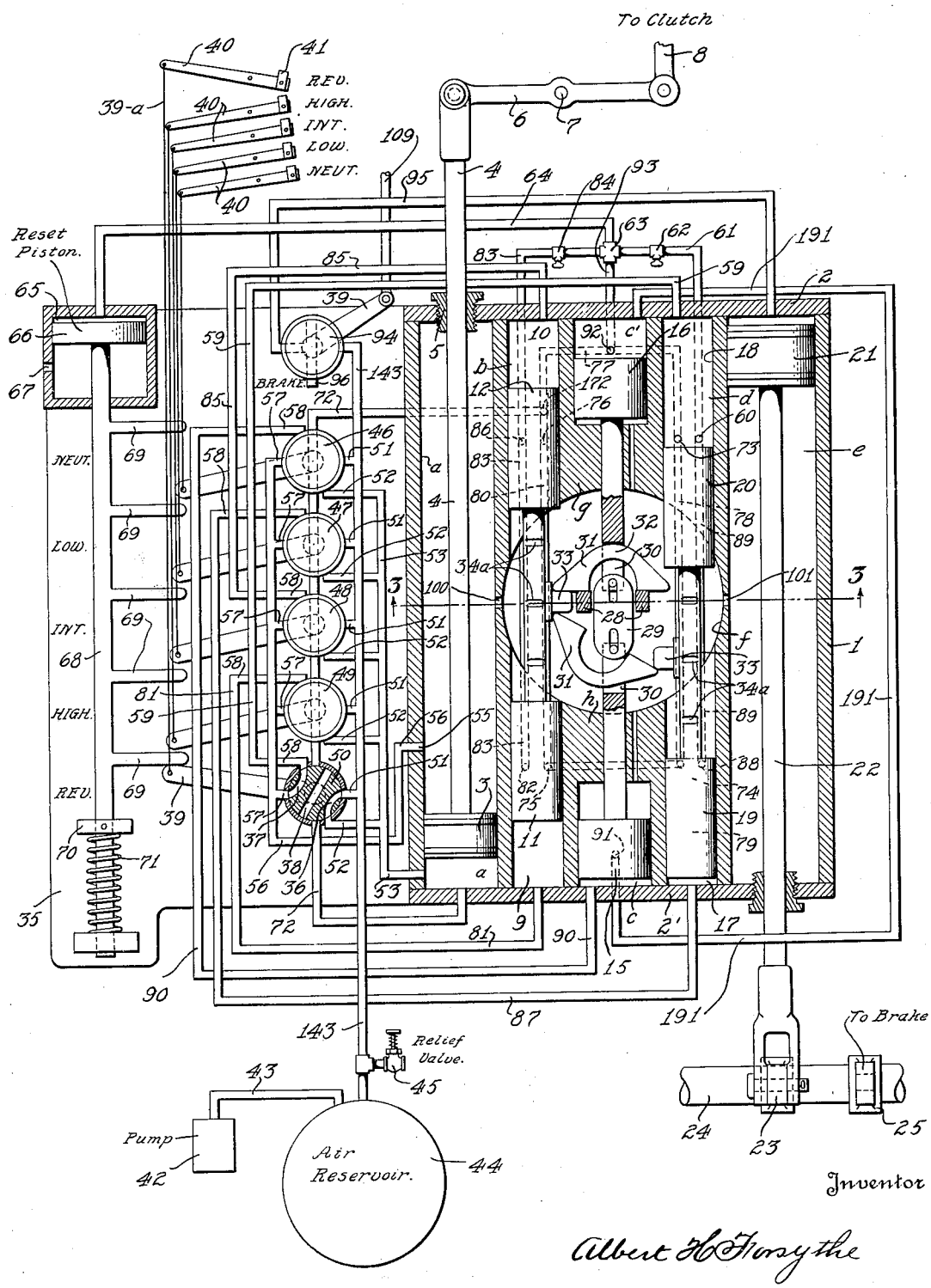
Figure 1 is the diagrammatic view illustrating my invention, certain mechanical operating parts being shown in section.

In the drawing which illustrates a construction that I have built, 1 is a block of metal through which is made four bores from side to side, two being at each side of the center of the block, forming respectively cylinders, $a$, $b$, $d$, and $e$, hereinafter to be described and these bores are closed at opposite ends by metal plates 2 and 2', forming the ends of these cylinders.

Figure 3:
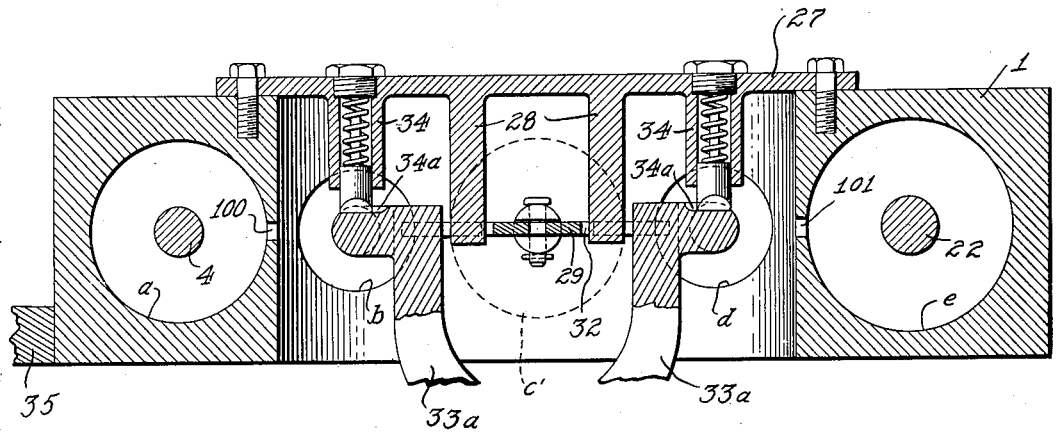
Fig. 3 is a section on line 3—3 Fig. 1 through the shifting cylinders.

I then cut a large circular hole from the top to the bottom of the block 1 as indicated at $f$ thus cutt.ng through the middle of the block 1 and cutting away part of the walls of bores $b$ and $d$ at the middle. The upper end of hole $f$, I then cover with a circular plate 27, Fig. 3, having lugs 28 projecting into the bore and utilized as stops. The middle portion of block 1 is then bored to form two opposite short cylinders $c$, $c'$, leaving metal walls $g$, $h$ through which pass piston rods. The lower end of the large hole $f$ seats over the gear case of the automobile.

In the cylinder $a$ I place a piston 3 having a piston rod 4 extending through a guide bushing 5 in the cover plate 2. This rod 4 abuts or is secured to the end of a lever 6, pivoted at 7, that actuates a rod 8 for releasing the clutch. The constructions 6, 7 and 8, will be varied according to the different makes of the motor vehicle to which my device is to be applied. It is simply necessary that there be an operating connection between the piston rod 4 suited to the particular kind of clutch in the particular kind of motor vehicle to which my device is to be applied, due consideration being had to the existing arrangement of the various parts of the motor vehicle.

The bore $b$ constitutes two cylinders, 9 and 10 in which move pistons 11 and 12 respectively, and these pistons are connected together and move as a unit. The bores c, c', form cylinders in which move pistons 15 and 16, respectively, which pistons also are connected together but in a manner to permit limited independent movement of the pistons. The bore d also constitutes two cylinders 17 and 18, in which move pistons 19 and 20 rigidly connected together. The bore e forms the cylinder for a piston 21, whose rod 22 is connected to a lever 23, on a shaft 24 that carries at one end an arm 25 connected by wires or rods to the rear wheel brake at the rear of the machine as is customary. The opposite end of shaft 24 on the other side of the vehicle carries a similar arm and connections 25 not shown, for the other rear wheel brake as is customary. It is immaterial what is the particular construction of brake actuating mechanism, it simply being necessary that rod 22 actuate the brake or brakes.

The pistons 16 and 15 are connected by a drag link 29 inserted in slots 30 of the piston rods. Inserted in these same slots and loose therein are dogs 31 having curved central portions 32 that at times rest over and ride on the rounded ends of the drag link 29. The extremities of these dogs abut against opposite sides of the stop lugs 28 and project beyond the stops a distance sufficient to engage lugs 33 on the connected pistons 11—12 and 19—20 which project laterally from the bores b and d respectively through the cut away portions of the walls thereof.

By this arrangement when one shifting piston pair moves to its operative position its lug 33 acts on one dog 32 to move one of the neutral pistons, which by reason of the drag link 29 moves the other neutral piston. This in turn moves the other dog, that first strikes one of the stops 28 and then moves the other shifting piston pair into inoperative or neutral position, if not already in that position.

The piston pairs 11—12 and 19—20 are preferably made in one piece consequently they reciprocate as a unit. The lugs 33 each carry a shifting fork 33ª, Fig. 3 for shifting the required gears.

Inserted through the top of plate 27 in sleeves 34 are usual spring urged latches for latching the piston pairs 11—12, 19—20, in their two end positions and in their middle position. These latches engage notches 34ª.

Connected to the block 1 is valve block 35, of lesser thickness in which are mounted the several pilot valves controlling the shift, and the valve resetting mechanism which will hereafter be described. In the actual construction of my device this block 35 and block 1 are bored with different passages and holes for the transmission of air, but which I shall indicate in the present drawings as pipes for the sake of clearness, in order that the air circuits may be more easily traced.

Figure 4:
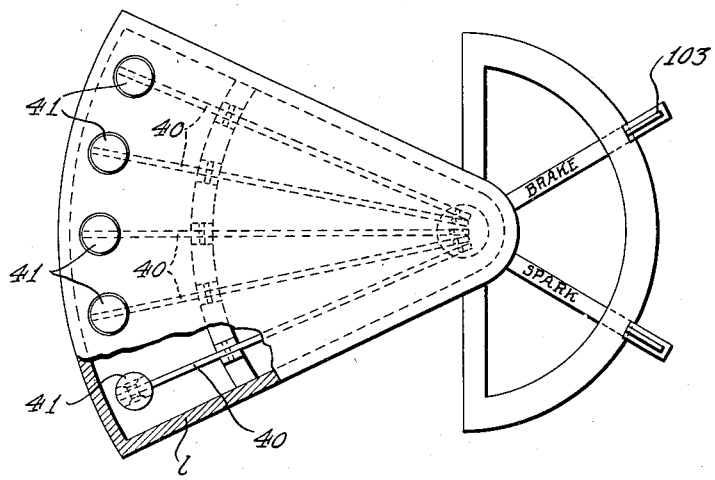
Fig. 4 is a plan view showing the arrangement of the selecting keys and levers at the steering wheel.

Each valve has passages as shown and when set for operation has a passage 36 for connecting the air inlet 51 of the air line 143 with the connection 52 to the line 53 to the cylinder a, operating the clutch. This valve also has a port 37 for connecting the exhaust line 56 of the clutch to the particular piston to be operated. Each pilot valve also has a straightway port 38 which registers, when returned to normal position, with an air line 72, common to all the pilot valves. Each valve is also provided with an actuating lever 39 and these levers are moved to position by means of pull wires 39ª, or the equivalent. Each wire is connected to one end of a lever 40 the opposite end of which lever carries a key 41 which upon depression will operate the wire attached to its lever. The keys and key levers are arranged in a sector shaped casing l, Fig. 4, mounted on the steering wheel of the automobile and that pass through the hollow steering shaft.

Mounted on the motor vehicle, and driven from any suitable part of the driving mechanism is an air pump 42 that delivers air by a pipe 43 to an air tank or reservoir 44 which in turn feeds the supply line 143 to each valve. A safety valve 45 is provided either on the pipe 143 or the tank 44.

Controlling the air from line 143 are the five pilot valves 46, 47, 48, 49 and 50 respectively controlling for example neutral, low, intermediate, high and reverse operations, customary with most manual shift mechanisms. Each of these valves has a connection 51, with the adjacent supply air line 143, and a port connection 52 with a pipe 53 admitting air below the clutch operating piston 3 in the bore or cylinder a. When piston 3 has moved sufficiently to release the clutch it uncovers a port 55 to which is connected the exhaust line 56, having port connections 57 with each of the pilot valves. These port connections 57 are connected, when the pilot valves are operated to other port connections 58, and each of said connections 58 is connected to a pipe leading to the cylinders whose pistons are to be operated. The port connection 58 of pilot valve 50 for the reverse shift is connected to a pipe 59 leading to cylinder 18 which cylinder has an exhaust port 60 uncovered by the piston 20 therein, which port connects with a pipe 61, containing a valve 62 and is connected to a union 63 from which leads a pipe 64 to a pneumatic valve resetting cylinder 65 containing a piston 66, which opens at the end of its travel a port 67, vented to the atmosphere. The piston 66 has a rod 68 from which project fingers 69, one for each of the five pilot valves mentioned, and a collar 70 against which operates the coil spring 71, the object of which spring is to return and hold said piston 66 in normal position preparatory to the next shift. Each finger 69 projects across the path of a valve lever 39 so that when said piston 66 is moved against the action of spring 71 lever 39 will be returned to its inoperative position at which time the straightway valve port 38 will register with an exhaust pipe 72 leading from the bottom of the clutch operating cylinder *a* and connecting the straightway passages of all pilot valves. This pipe 72 discharges into the particular cylinder whose piston has been operated in this instance cylinder 18, at port 73, hence the discharged air passes through this cylinder 18 to the exhaust port 60 and out through pipe 61, valve 62, union 63 pipe 64, cylinder 65 and exhaust 67. It will be noted that valves 62 and 84 acting as throttle valves, are adjusted by hand and such adjustment controls the speed of operation of the two pairs of shift-pistons.

In order that this exhaust of the clutch operating cylinder *a* shall take place through the particular shifting cylinder whose piston has been operated; each of the four cylinders, 18—17, 10—9, are provided with exhaust admission ports 73, 74, 75 and 76, that are uncovered at or about the same time, the respective shifting positions have reached their limit of movement. These four ports are connected together by pipes 77, 78, 79 and 80, so that the pipe 72 may discharge through any one of the four ports, 73, 74, 75 and 76, which happen to be uncovered by its piston. The pipes 77, 78, 79 and 80 form a closed rectangle or circle if preferred into which the pipe 72 discharges at 172.

If the gears are to be shifted for high speed, pilot valve 49 is set by pulling its wire on depressing its key 41 marked "high" when pilot valve will connect the high pressure supply line 143 through its connection 51 to connection 52 and the pipe 53 leading to the bottom of the clutch cylinder *a*. When the clutch has been released and piston 3 has passed port 55 the air passes through line 56, connection 57 plug passage 37, connection 58, pipe 81, to cylinder 9 and moves its piston 11 to effect the shifting of the gear to high speed position. The movement of piston 11 also uncovers, after the shifting operation, exhaust port 82, which port is connected to a pipe 83, containing a valve 84. Pipe 83 connects to union 63 and discharges through pipe 64 cylinder 55, exhaust 67 as previously described with respect to valve 50.

Valve 49 is then closed, placing its straight way passage 38 in register with the exhaust line 72, which connects to pipe 80 and exhausts into cylinder 9 through port 75, all other ports on the rectangular circuit being closed by their pistons. The air then passes from the cylinder to exhaust port 82, pipe 83, valve 84 union 63 and as before described.

If now valve 48 is operated to shift to intermediate speed, it in like manner connects air supply conduit 143, to the pipe 53, to operate the clutch piston 3, which vents as before through port 55, pipe 56, connection 57 plug passage 37, connection 58 to a pipe 85, to cylinder 10, moving piston 12, to shift the gear after which piston 12 uncovers port 86, and allows the pressure air to escape from cylinder 10 to pipe 83, valve 84, union 63, and as before, causing the pilot valve 48 to close thus opening the straightway passage in this valve and allowing the clutch operating cylinder *a* to exhaust through pipe 72, port 76, into cylinder 10, the one whose piston has been operated. The air then passes through port 86, pipe 83, valve 84, union 63, and as before described with reference to the other pilot valves.

If we now desire to enter "low" speed, pilot valve 47 is operated by its key 41, causing the pilot valve passage 36 to connect the pressure line 143, to be connected to the clutch supply line 53 for operating the clutch. Clutch piston vents the air through port 55, clutch discharge line 56, back to pilot valve 47, and connection 58 to a pipe 87 entering the cylinder 17 operating the piston 19 therein, to set the gear to low speed, after which piston 19 uncovers exhaust port 88 which is connected to a pipe 89 that connects with pipe 61. Thence the air passes by valve 62, union 63, and as before returning the pilot valve 47 to normal position, causing its straightway passage 38 to open the exhaust line 72 to exhaust the air from the clutch cylinder through pipes 77, 78, of the quadrangle circuit, to port 74, or through pipes 80 and 79 to port 74 or by both passages, into cylinder 17, the one whose piston has been operated, through the open exhaust port 88 therein to pipe 89, pipe 61, valve 62, union 63, and as before described.

If now the "neutral" position of the gears is to be obtained, we must operate both of the pistons 15 and 16, in order to cause the dogs 31, and 32 to bring the double pistons 11—12 and 19—20 into their middle position. When pilot valve 46 is opened, by depressing its key 41 air is admitted beneath the clutch piston, vented therefrom back to the pilot valve 46, as described with respect to the other pilot valves. This vented air then passes through connection 58 to pipe 90 leading to a neutral cylinder *c*. Piston 15 is thereby forced forward causing its dog 31 to move the lugs 33 to middle position as the dog is forced against the stops 28. This movement of piston 15 uncovers a port 91, connected to pipe 191 leading to cylinder c', thus venting this cylinder to cylinder c'. Piston 16 is then moved and in like manner its dog 31 is moved to its neutral position shown in Fig. 1, resting on lugs 28. When piston 16 moves past port 92 it vents both cylinders c and c' to a pipe 93 connected to port 92, union 63, and as before to reset the neutral pilot valve 46. Port 92 of the neutral cylinder is connected to pipes 79 and 77 so that when this port is uncovered, and the pilot valve straightway-port 38 opens the exhaust line 72 of the clutch operating cylinder, this air can exhaust through port 92 into pipe 93, union 63 and as before described. Thus before the pilot valve 46 can be re-set, the operating air shall have passed first through the clutch operating cylinder a and the two neutral cylinders in succession assuring operation of all three pistons before re-setting the pilot valve.

In addition to shifting the gears and operating the clutch, I may also operate the brake piston 21. For this purpose I provide a three-way control valve 94, which when its operating arm 39 is turned from the position shown will connect the pressure air pipe 143 with an air line 95, and hold this pressure air on the piston 21 until released, which is done by shifting the lever 39, whereupon the three-way valve is turned to exhaust at 96 into the atmosphere, or if the maker prefers, this discharge opening 96 may be connected by a pipe to the exhaust manifold, or the muffler.

While I have indicated a spring 71, to return the piston 66 to normal position after exhaust from the shifting cylinder and the clutch operating cylinder has been completed, this spring may and preferably is not sufficient to return a piston 66 as described, but is simply an unloading spring, and the piston is returned to its normal position by the particular lever 39 as it is pulled to open one of the pilot valves. This lever 39 strikes against its finger 69 and moves the rod 68 longitudinally and piston 66 into position ready for operation. To this end, piston 66 has not an air tight fit, but some leakage is past the piston so that the air remaining in its cylinder 65, at atmospheric pressure, may easily be forced out when the piston is manually returned to normal position by pulling lever 39.

When one of the pistons 11—12, 19—20 is moved on its operating stroke, its opposite piston is caused to close its pair of exhausts ports, thus holding a volume of air at atmospheric pressure in the cylinder, and compressing this air on the power stroke of the piston. The operation of the clutch is followed so quickly by the operation of one of the shifting pistons that this air cushion due to the compression of the air at atmospheric pressure in cylinder is of considerable advantage, in gradually retarding the movement of the piston.

The mechanism is self-oiling. The opening f in block 1 at the bottom when this block seats on the gear case, naturally gets the oil splash from this case which is filled with oil. The mechanism about this opening becomes covered with oil and in order to pass oil to the adjacent closed cylinders a and e I bore small holes 100 and 101 between a and b and between d and e, respectively.

If air is used, this air will carry sufficient oil from the various cylinders to lubricate all the moving parts. The air circuit is continuous from the air tank 44 through the clutch cylinder a, the cylinder selected for operation, the cut off cylinder 65 to the atmosphere and enough oil is carried by this air to lubricate the pilot valves and all other moving parts.

In starting the car from low or reverse the engagement of the clutch should be slower and more gradual than when shifting to "high" and "intermediate" and to this end I insert the control or regulating valves 62 and 84 in the exhaust lines so that the valve 62 may be opened to a less extent than valve 84, thus giving the desired speeds of exhaust.

It is impossible to shift both of the shifting forks at the same time, should two of the keys 41 be simultaneously depressed. For example, should pressure fluid be admitted to cylinders 9 and 17 simultaneously both pistons 11 and 19 would move together striking with their lugs 33 against the dog 32 (upper in Fig. 1) drawing the piston 15 by drag link 29 and causing the other (lower) dogs to strike stops 28 and arrest the movement of the shifting pistons.

Figure 2:
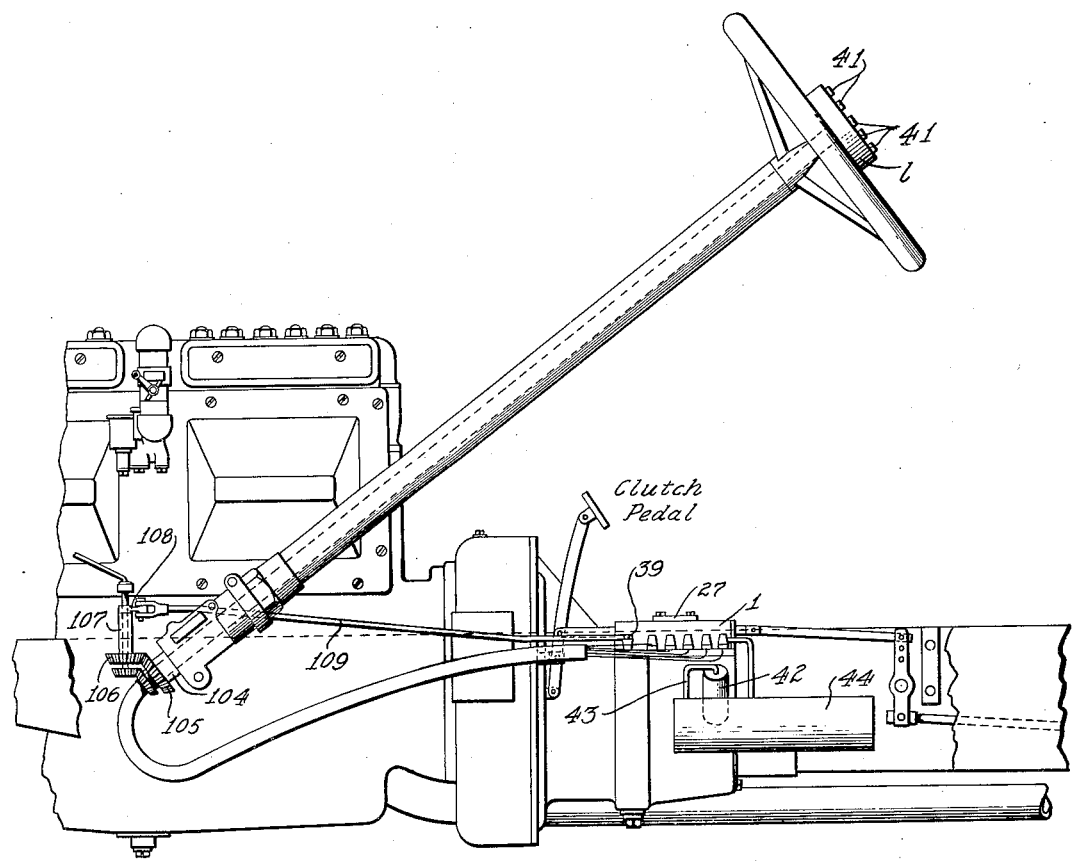
Fig. 2 is a side view of part of the operating mechanisms of an automobile showing my invention attached thereto.

The brake valve is operated by brake lever 103 at the steering wheel and operates a sleeve 104 Fig. 2 provided with a mitre gear 105 that operates a mitre gear 106 on sleeve 107 carrying a short lever 108 connected to a rod 109 that operates the lever 39 of the brake actuating valve.

I claim—

1. In a mechanism of the character described, a fluid actuated gear shifting means, a fluid actuated clutch operating means adapted to be operated in series therewith, and a single manually operated device to cause a single stream of operating fluid to first actuate said clutch operating means and then the gear shifting means.

2. In a mechanism of the character described, a plurality of fluid actuated gear shifting means, fluid actuated clutch operating means, any one of which shifting means is adapted to be operated in series therewith, and a single manually operated device for effecting the movement of a gear shifting means into an operative position after first effecting the operation of said clutch.

3. In a mechanism of the character described, a plurality of fluid actuated gear shifting means, a fluid actuated clutch operating mechanism, a single fluid controlling device to send operating fluid to said clutch operating mechanism, and to a gear shifting means, and means operated by the gear shifting means to automatically return a previously shifted gear shifting means to neutral position.

4. In a mechanism of the character described, a plurality of fluid actuated gear shifting means, a fluid actuated clutch operating mechanism, a single fluid controlling device to send operating fluid to said clutch operating mechanism and to a gear shifting means, means operated by the gear shifting means operated to automatically return a previously shifted gear shifting means to neutral position, and a separate fluid controlling means to independently restore shifted gear shifting means to neutral position.

5. In a fluid operated gear shifting mechanism, a fluid actuated clutch operating device, a separate fluid actuated gear shifting device including a cylinder and a single acting piston therein, and a single manually operated device to cause operating fluid to first actuate said clutch operating device and thereafter cause fluid passing through the clutch operating device to operate one side of the piston of said gear shifting device.

6. In a pneumatically operated gear shifting mechanism, a pneumatically actuated clutch operating device, a pneumatically actuated gear shifting device, a single manually operated means to cause operating air to first expand and actuate said clutch operating device and thereafter further expand in full volume as actuating medium and to operate said gear shifting device, and means operated by the movement of one gear shifting device to move another gear shifting device into neutral position.

7. In a pneumatically operated gear shifting mechanism, a clutch operating piston and cylinder, a gear shifting piston and cylinder, means to direct operating air to said cylinders in series, and means to adjust the exhaust of the gear shifting cylinder with relation to the speed of operation of the clutch operating piston.

8. In a pneumatically operated gear shifting mechanism, a clutch operating cylinder and piston, a plurality of gear shifting cylinders and pistons, means to direct operating air through said clutch operating cylinder and one of said gear shifting cylinders, and pneumatically operated means actuated by the exhaust from said gear shifting cylinder to operate said air directing means to automatically cut off the supply of air to said clutch operating cylinder.

9. In a pneumatically operated gear shifting mechanism, a clutch operating cylinder and piston, a plurality of gear shifting cylinders and pistons, means to direct operating air through said clutch operating cylinder and one of said gear shifting cylinders, and pneumatically operated means actuated by the exhaust from said gear shifting cylinder to operate said air directing means to automatically cut off the supply of air to said clutch operating cylinder, and means between said gear operating cylinder and pneumatically operated means to throttle the air pressure between them.

10. In a pneumatically operated gear shifting mechanism, two pairs of rigidly connected pistons and their cylinders, a pair of pistons connected for limited independent movement and their cylinders, a clutch operating piston and cylinder, each rigidly-connected piston cylinder arranged to permit exhaust into each cylinder of the independently movable connected pistons and means actuated by either rigidly connected pair of pistons to operate one of the movably-connected pistons to bring the other pair of rigidly connected pistons into neutral position.

11. In a pneumatic gear shifting mechanism, a clutch operating piston and gear shifting pistons, an air supply and a valve controlling admission of the air first to the clutch cylinder and directing the exhaust from the clutch cylinder to the cylinder and piston operating the gear to be shifted, and means to conduct the exhaust of said latter piston to a valve actuating mechanism to cut off the air supply and automatically exhaust.

12. In a gear shifting mechanism, a clutch shifting piston, and cylinder, gear shifting piston and cylinder, means to supply fluid under pressure to said clutch shifting piston to hold the clutch released, and means to convey all of the fluid passing through the clutch cylinder to a gear shifting cylinder as power medium and utilizing all of the fluid at one end of the piston to operate it in one direction.

13. In a gear shifting mechanism, a clutch operating piston and cylinder having a piston-controlled exhaust port, a plurality of gear shifting pistons and cylinders having piston-controlled exhaust ports, and means to selectively direct operating fluid to said clutch cylinder and any gear shifting cylinder in series to operate its piston and automatically exhaust through the piston-controlled port therein.

14. In a gear shifting mechanism, a clutch-operating piston and cylinder having a piston-controlled exhaust port, a plurality of gear shifting pistons and cylinders having piston-controlled exhaust ports, and means to direct operating fluid to said clutch cylinder and from said clutch cylinder to any gear shifting cylinder in series with said clutch cylinder to operate its piston and automatically exhaust through the piston-controlled port therein, and means to direct residual operating fluid from the clutch-operating cylinder to the cylinder whose piston has been operated for exhaust through its piston-controlled exhaust port.

15. In a gear shifting mechanism, a clutch operating piston and cylinder, a plurality of gear shifting pistons and cylinders having piston-controlled ports, a pilot valve for controlling the pistons for each shift, means to selectively operate said valves, a source of fluid under pressure controlled by all of said valves, each valve arranged to direct motive fluid first to the clutch operating cylinder and then direct the fluid from said cylinder to the shifting cylinder controlled by said valve means to automatically re-set said valves operated by the fluid exhausted from the selected shifting piston controlled port, and means to conduct residual operating fluid from the clutch operating cylinder through the selected valve after the operating fluid has been cut off to the selected cylinder for exhaust through its piston controlled port to said valve re-set means.

16. In a fluid operated shifting mechanism, two pairs of rigidly connected pistons, a lug on each pair, a pair of connected pistons having limited independent movement and arranged between the aforesaid pairs of pistons, stops between the pair of independently movable pistons, a dog carried by each of said independently movable pistons, and having independent movement with respect thereto whose ends are arranged to project in the path of said lugs and to engage said stops, whereby when the independently movable pistons are operated said dogs will be forced to said stops and move the rigidly connected pistons to middle position.

17. In a fluid operated shifting mechanism, two pairs of rigidly connected fluid-operted pistons, a pair of neutral pistons arranged between the aforesaid pairs of rigidly connected pistons, means to connect the neutral pistons for limited independent movement and means operated by said neutral pistons to position the rigidly connected pistons in middle positions and mechanical devices to hold said rigidly connected pistons in the positions to which they have been moved.

18. In a fluid operated gear shifting mechanism, two parallel pairs of rigidly-connected shifting pistons each carrying a gear shifting fork, and a lug intermediate the ends of each piston pair projecting toward the lug of the other pair, a pair of alined neutral pistons parallel to and between the pairs of rigidly connected pistons, each neutral piston having a slotted piston rod, a slotted link connecting said rods, dogs having central arcuate portions mounted loose in said slots, and stops arranged in the middle position of said rigidly connected pistons, each of said dogs arranged to project over said stops in the path of both of said lugs.

19. In a fluid operated gear shifting mechanism, a clutch-operating piston and cylinder, two pairs of rigidly connected gear shifting pistons and cylinders each having a piston-controlled port, and an auxiliary piston controlled port, fluid conducting means connecting all of said auxiliary ports, and means to connect the exhaust of said clutch cylinder to said fluid conducting means 20. In a fluid operated gear shifting mechanism, a clutch operating piston and cylinder, two pairs of rigidly connected gear shifting pistons and cylinders, each having a piston-controlled port and an auxiliary piston controlled port, fluid conducting means connecting all of said auxiliary ports, and means to connect the exhaust of said clutch cylinder to said fluid conducting means, and a pair of independently movable connected neutral pistons having piston-controlled ports connected to said fluid conducting means.

21. In a fluid operated gear shifting mechanism, a metal block having a pair of horizontal spaced parallel bores, and a transverse vertical bore passing through said block and cutting the aforesaid bores, two alined bores between said parallel bores forming neutral cylinders, a clutch bore parallel with said pair of bores and an oil hole between the clutch bore and one of the parallel bores out of the path of operating pistons therein.

22. In a fluid operated gear shifting mechanism, a metal block having a pair of horizontal spaced parallel bores, and a transverse vertical bore passing through said block and cutting the aforesaid bores, two alined bores between said parallel bores forming neutral cylinders, a clutch bore parallel with said pair of bores and an oil hole between the clutch bore and one of the parallel bores out of the path of operating pistons therein, and a brake bore also parallel to said pair of bores having an oil hole between it and the other bore of said pair out of the path of the pistons therein, said vertical bore fitting at one end over the gear casing and a cover for the other end.

23. In a pneumatic gear shifting mechanism, a plurality of shifting pistons and cylinders, a clutch operating piston and cylinder, a pilot valve for each shifting piston, a source of pressure air, each pilot valve arranged to connect the source of air to said clutch cylinder and simultaneously connect the exhaust of said cylinder to the respective shifting cylinder for automatic exhaust therefrom after the shifting operation, and means in the pilot valve to thereafter connect the clutch cylinder exhaust to the cylinder whose piston has been operated.

24. In a fluid operated gear shifting mechanism, gear shifting pistons, pilot valves for controlling fluid under pressure to said pistons, selecting means for arrangement on the steering wheel of a motor vehicle, flexible connections between the selecting means and valves, a re-setting piston and cylinder, means on the latter piston to return any of the selected valves to normal position and operated by fluid after the fluid has actuated a shifting piston.

25. In a pneumatic gear shifting mechanism, two pairs of rigidly connected gear shifting pistons and their cylinders, a lug connected to and movable with each pair of shifting pistons, a pair of connected neutral pistons having slight movement independently of each other and their cylinders, a pair of stationary stops between the latter pistons and cylinders, a dog carried by each independently movable neutral piston co-operating with said lugs and stops, whereby upon the operative movement of one pair of shifting pistons the other pair of shifting pistons is brought to neutral position by one of said dogs.

26. In a pneumatic gear shifting mechanism, two pairs of rigidly connected pistons, a shifting fork carried by each pair, a stop at the neutral position of each pair of pistons, a dog arranged to engage both pairs of pistons and both stops on one side of the latter, and a like dog to engage both pairs of pistons on the opposite sides of said stops.

27. In a pneumatic gear shifting mechanism, two pairs of rigidly connected pistons, a shifting fork carried by each pair, a stop at the neutral position of each pair of pistons, a dog arranged to engage both pairs of pistons and both stops on one side of the latter, a like dog to engage both pairs of pistons on the opposite sides of said stops, and means to prevent the movement of a dog with respect to another when more than one piston is accidentally operated, whereby the piston pairs are prevented from moving from their neutral position.

In testimony that I claim the foregoing as my invention, I have signed my name.

ALBERT H. FORSYTHE.